US011900737B2

United States Patent
Lim et al.

(10) Patent No.: US 11,900,737 B2
(45) Date of Patent: Feb. 13, 2024

(54) FAILURE DIAGNOSIS DEVICE FOR WHEEL BEARING

(71) Applicant: ILJIN GLOBAL Co., Ltd, Seoul (KR)

(72) Inventors: Jong Keun Lim, Seoul (KR); Seok Woo Lee, Seoul (KR); Kyeong Hyeon Kim, Seoul (KR)

(73) Assignee: ILJIN GLOBAL Co., Ltd, Seoul (KR)

( * ) Notice: Subject to any disclaimer, the term of this patent is extended or adjusted under 35 U.S.C. 154(b) by 279 days.

(21) Appl. No.: 17/181,181

(22) Filed: Feb. 22, 2021

(65) Prior Publication Data

US 2021/0264700 A1    Aug. 26, 2021

(30) Foreign Application Priority Data

Feb. 21, 2020 (KR) .................... 10-2020-0021888

(51) Int. Cl.
| | | |
|---|---|---|
| *G07C 5/08* | (2006.01) | |
| *G01P 1/02* | (2006.01) | |
| *G01P 7/00* | (2006.01) | |
| *G01P 15/00* | (2006.01) | |

(52) U.S. Cl.
CPC ............ *G07C 5/0825* (2013.01); *G01P 1/023* (2013.01); *G01P 7/00* (2013.01); *G01P 15/00* (2013.01); *G07C 5/0808* (2013.01)

(58) Field of Classification Search
CPC ..... G07C 5/0825; G07C 5/0808; G01P 1/023; G01P 7/00; G01P 15/00
USPC ...................................... 73/115.07
See application file for complete search history.

(56) References Cited

U.S. PATENT DOCUMENTS

| | | | | |
|---|---|---|---|---|
| 6,830,379 | B2 * | 12/2004 | Morita .................. | B60C 23/042 384/448 |
| 7,336,067 | B2 * | 2/2008 | Inoue .................... | F16C 19/186 324/174 |
| 7,819,026 | B2 * | 10/2010 | Ozaki ................... | F16C 19/522 73/862.322 |
| 7,856,893 | B2 * | 12/2010 | Ozaki ................... | F16C 19/522 73/862.321 |
| 11,585,383 | B2 * | 2/2023 | Jeon ....................... | G01P 3/443 |

(Continued)

FOREIGN PATENT DOCUMENTS

| | | | | | |
|---|---|---|---|---|---|
| CN | | 107250586 A | * | 10/2017 | .............. F16C 19/00 |
| EP | | 2019304 A2 | * | 1/2009 | .......... G01M 13/045 |

(Continued)

*Primary Examiner* — Stephanie E Bloss
*Assistant Examiner* — Kevin C Butler
(74) *Attorney, Agent, or Firm* — Dinsmore & Shohl LLP; Yongsok Choi, Esq.

(57) ABSTRACT

According to one embodiment of the present disclosure, there is provided a failure diagnosis device used for diagnosing the presence of failure or abnormal operation of a wheel bearing. The failure diagnosis device according to one embodiment of the present disclosure may comprise a housing; a magnetic coupling part provided in the housing; and a sensing part provided in the housing and configured to detect physical characteristic related to an operational state of a vehicle. According to one embodiment of the present disclosure, the sensing part may comprise an acceleration sensor configured to collect acceleration information, and the failure diagnosis device may be configured to be detachably mounted to one side of a wheel by virtue of a magnetic force generated by the magnetic coupling part.

11 Claims, 5 Drawing Sheets

(56) References Cited

U.S. PATENT DOCUMENTS

| | | | | |
|---|---|---|---|---|
| 2003/0093188 A1* | 5/2003 | Morita | ............... | B60C 23/0408 |
| | | | | 701/1 |
| 2006/0277985 A1* | 12/2006 | Faetanini | .............. | F16C 33/723 |
| | | | | 73/121 |
| 2009/0120184 A1* | 5/2009 | Ozaki | ................... | F16C 19/522 |
| | | | | 73/494 |
| 2021/0264700 A1* | 8/2021 | Lim | .......................... | G01P 7/00 |
| 2021/0278315 A1* | 9/2021 | Lim | .......................... | G01P 7/00 |

FOREIGN PATENT DOCUMENTS

| | | | | |
|---|---|---|---|---|
| EP | 2006652 A9 * | 7/2009 | ............. | B60B 27/00 |
| JP | 2005345277 A * | 12/2005 | | |
| JP | 7181162 B2 * | 7/2019 | ............. | B66B 31/00 |
| KR | 20160050751 A * | 5/2016 | ............... | B61K 9/04 |
| KR | 20210009735 A * | 7/2019 | ............. | B60B 27/00 |
| KR | 20210106845 A * | 2/2020 | ........ | B60B 27/0068 |
| KR | 20200082896 A * | 7/2020 | ............. | B60B 27/00 |
| KR | 20200082910 A * | 7/2020 | ............. | B60B 27/00 |
| KR | 20210107229 A * | 9/2021 | ........ | B60B 27/0068 |
| KR | 20220069640 A * | 5/2022 | ............. | G01H 17/00 |
| WO | WO-2007029512 A1 * | 3/2007 | ........ | B60B 27/0005 |
| WO | WO-2007105365 A1 * | 9/2007 | ............. | B60B 27/00 |
| WO | WO-2020060017 A1 * | 3/2020 | ........ | B60B 27/0005 |
| WO | WO-2020141677 A1 * | 7/2020 | ........... | B60B 27/001 |

* cited by examiner

FAILURE DIAGNOSIS DEVICE FOR WHEEL BEARING

CROSS-REFERENCE TO RELATED APPLICATION

This application claims priority to Korean Patent Application No. 10-2020-0021888 filed on Feb. 21, 2020, the entire contents of which are herein incorporated by reference.

TECHNICAL FIELD

The present disclosure relates to a failure diagnosis device used for diagnosing the presence of failure or abnormal operation of a wheel bearing, more particularly, to a failure diagnosis device for a wheel bearing which has a simplified structure and is configured to be detachably mounted to a wheel or wheel bearing of a vehicle to diagnose the presence of failure or abnormal operation of the wheel bearing.

BACKGROUND ART

A wheel bearing is a device for supporting a wheel of a vehicle while rotatably mounting the wheel to a vehicle body, and performs a function of connecting a rotating element to which the wheel is mounted to a non-rotating element fixed to the vehicle body through rolling elements such that the wheel mounted to the rotating element is supported on the vehicle body while being rotatably mounted to the vehicle body.

When a vehicle is travelling, a high load and moment may be applied to a wheel bearing in radial and axial directions. As a result, damage such as flaking may be generated on an outer ring and/or an inner ring that support the rolling elements, which may cause damage of the rings. Such damage may cause noise, vibration, heat generation, or the like, and in severe cases, may cause an accident in which the wheel bearing is sticking or separated from a driving shaft.

Since chassis components such as a wheel bearing did not have a diagnosis function of monitoring an operational state of the components, the driver or mechanic had to sense noise or vibration by himself (or herself) and had to intuitively determine abnormality in the chassis components such as a wheel bearing. However, there may be a large difference in such an intuitive determination depending on a level of skill of the driver. This makes it difficult to ensure the reliability of the determination result. Accordingly, accurate failure diagnosis may not be performed.

For example, when a wheel bearing is diagnosed in a service station, the mechanic has inspected the presence of failure or abnormal operation of the wheel bearing by a sensory inspection such as hearing or the like. However, such an inspection method may often show different inspection results depending on the capability and condition of the mechanic, which makes it difficult to perform accurate failure diagnosis. For this reason, about 40% of warranty products, which are replaced due to the abnormality of a wheel bearing, have been classified as No Trouble Found (NTF) failure which represents that the presence of failure and/or the cause of failure is unambiguous.

In order to solve this problem, there have been proposed techniques for monitoring and diagnosing an operational state of chassis components including a wheel bearing by attaching a sensor to the wheel bearing or the like.

However, since failure diagnosis techniques known in the related art are configured to perform failure diagnosis with a diagnosis device having a complicated structure in which an acceleration sensor and a rotational speed sensor are provided, there are problems in that the structure of the wheel bearing or peripheral parts thereof is complicated and the manufacturing cost is increased. Further, there is a problem in that failure diagnosis cannot be performed when a failure diagnosis device is not provided in advance in manufacturing a part such as a wheel bearing or the like.

SUMMARY

Technical Problem

The present disclosure is made in view of the above problems, and an object of the present disclosure is to provide a failure diagnosis device which is capable of performing failure diagnosis in a reliable manner with a simplified structure, and is configured to be detachably mounted to a wheel of a vehicle or the like so as to be able to perform failure diagnosis on a wheel bearing of various types of vehicles.

Technical Solution

Representative configurations of the present disclosure for achieving the above object is as follows.

According to one embodiment of the present disclosure, there is provided a failure diagnosis device used for diagnosing the presence of failure or abnormal operation of a wheel bearing. The failure diagnosis device according to one embodiment of the present disclosure may comprise a housing; a magnetic coupling part provided in the housing; and a sensing part provided in the housing and configured to detect physical characteristic related to an operational state of a vehicle. According to one embodiment of the present disclosure, the sensing part may comprise an acceleration sensor configured to collect acceleration information, and the failure diagnosis device may be configured to be detachably mounted to one side of a wheel by virtue of a magnetic force generated by the magnetic coupling part.

According to one embodiment of the present disclosure, the failure diagnosis device may be configured to be detachably mounted to one side of the wheel by virtue of the magnetic force generated between a wheel mounting bolt or a wheel mounting nut, which is used to mount the wheel to the wheel bearing, and the magnetic coupling part.

According to one embodiment of the present disclosure, the magnetic coupling part may be formed by magnetizing steel material.

According to one embodiment of the present disclosure, a recess formed to be concave may be provided in one side of the housing, and the wheel mounting bolt or the wheel mounting nut, which is used to mount the wheel to the wheel bearing, may be inserted into and accommodated in the recess.

According to one embodiment of the present disclosure, the magnetic coupling part may comprise a groove formed to be concave at a surface toward the recess.

According to one embodiment of the present disclosure, the housing may be formed by insert-molding thermoplastic plastic material.

According to one embodiment of the present disclosure, the sensing part may be mounted on a PCB board provided in the housing.

According to one embodiment of the present disclosure, the failure diagnosis device may further comprise a storage part that stores information on the operational state of the vehicle measured by the sensing part.

According to one embodiment of the present disclosure, the failure diagnosis device may further comprise a diagnosis part configured to diagnose the presence of failure or abnormal operation of the wheel bearing based on information on the operational state of the vehicle measured by the sensing part.

According to one embodiment of the present disclosure, the diagnosis part may be configured to perform frequency analysis on acceleration information measured by the acceleration sensor of the sensing part to diagnose the presence of failure or abnormal operation of the wheel bearing.

According to one embodiment of the present disclosure, the diagnosis part may be configured to diagnose the presence of failure or abnormal operation of the wheel bearing based on acceleration information measured by the acceleration sensor of the sensing part and speed information calculated from the acceleration information.

According to one embodiment of the present disclosure, the failure diagnosis device may further comprise a display part configured to display information on the presence of failure or abnormal operation of the wheel bearing according to a diagnosis result obtained from the diagnosis part.

Further, the failure diagnosis device according to the present disclosure may further comprise other additional configurations without departing from the technical sprit of the present disclosure.

Advantageous Effects

The failure diagnosis device according to one embodiment of the present disclosure is configured to be detachably mounted to one side of a wheel (for example, a wheel mounting bolt, a wheel mounting nut, or the like) by using a magnetic force generated by a magnetic coupling part (magnetic member) provided in the failure diagnosis device. This configuration makes it possible to detachably mount the failure diagnosis device to various types of vehicles in a free manner to diagnose the presence of failure of a wheel bearing. It is therefore possible to prevent occurrence of improper maintenance or excessive maintenance. As a result, it is possible to reduce maintenance cost and to prevent unnecessary cost waste.

In addition, the failure diagnosis device according to one embodiment of the present disclosure can be manufactured to have a simplified small-sized structure in which only some components such as a magnetic coupling part, a sensing part, and the like are provided in the housing. Thus, it is possible to greatly improve the manufacturing productivity of the failure diagnosis device for a wheel bearing.

Further, the failure diagnosis device according to one embodiment of the present disclosure is configured to be able to be coupled with a wheel mounting bolt, a wheel mounting nut or the like provided in a wheel of a vehicle by virtue of a magnetic force. This may eliminate a need to provide a complicated device for diagnosing the presence of failure of a wheel bearing in the wheel bearing in advance at the time of manufacturing the wheel bearing. Thus, it is possible to reduce the manufacturing cost of the wheel bearing and improve a degree of freedom of design of the wheel bearing.

DETAILED DESCRIPTION

Figure 1:
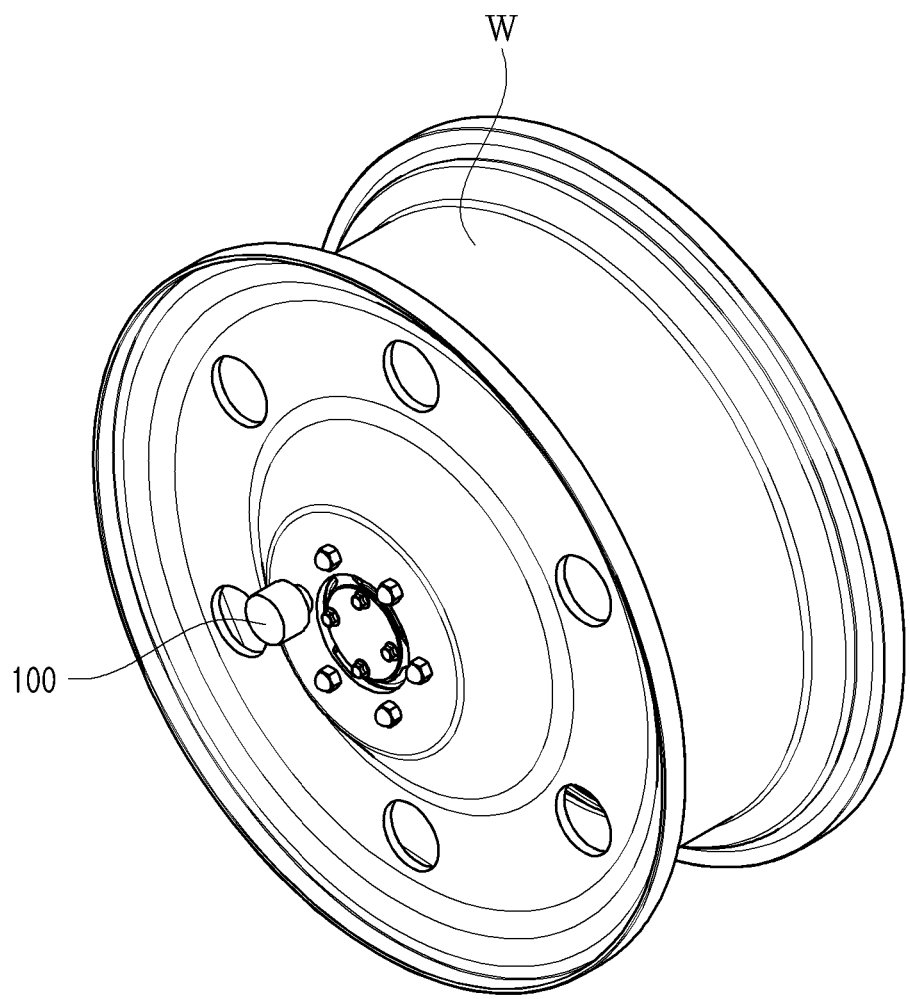
FIG. 1 exemplarily shows a state in which a failure diagnosis device according to one embodiment of the present disclosure is mounted to one side of a wheel of a vehicle.

Hereinafter, preferred embodiments of the present disclosure will be described in detail with reference to the appended drawings to such an extent that the present disclosure can be readily practiced by one of ordinary skill in the art.

Detailed descriptions of parts irrelevant to the present disclosure will be omitted for the purpose of more clearly describing the present disclosure. Throughout the specification, the same components will be described using same reference numerals. In addition, the shapes and sizes of the respective components shown in the drawings are arbitrarily shown for the sake of convenience in explanation, and hence the present disclosure is not necessarily limited thereto. That is, it should be understood that specific shapes, configurations, and characteristics described in the specification may be modified in various embodiments without departing from the spirit and scope of the prevent disclosure, and positions or arrangements of individual components may be modified without departing from the spirit and scope of the prevent disclosure. Therefore, detailed descriptions to be described below should be construed as non-limitative senses, and the scope of the prevent disclosure should be understood to include appended claims and their equivalents.

Failure diagnosis device for a wheel bearing according to one embodiment of the present disclosure.

Referring to FIGS. 1 to 5, a failure diagnosis device 100 according to one embodiment of the present disclosure and a wheel bearing 10 to which the failure diagnosis device 100 is mounted are exemplarily shown. For example, the failure diagnosis device 100 according to one embodiment of the present disclosure may be configured to be detachably mounted to a wheel W coupled with the wheel bearing 10 so as to detect the presence of failure or abnormal operation of the wheel bearing, as described below.

Figure 2:
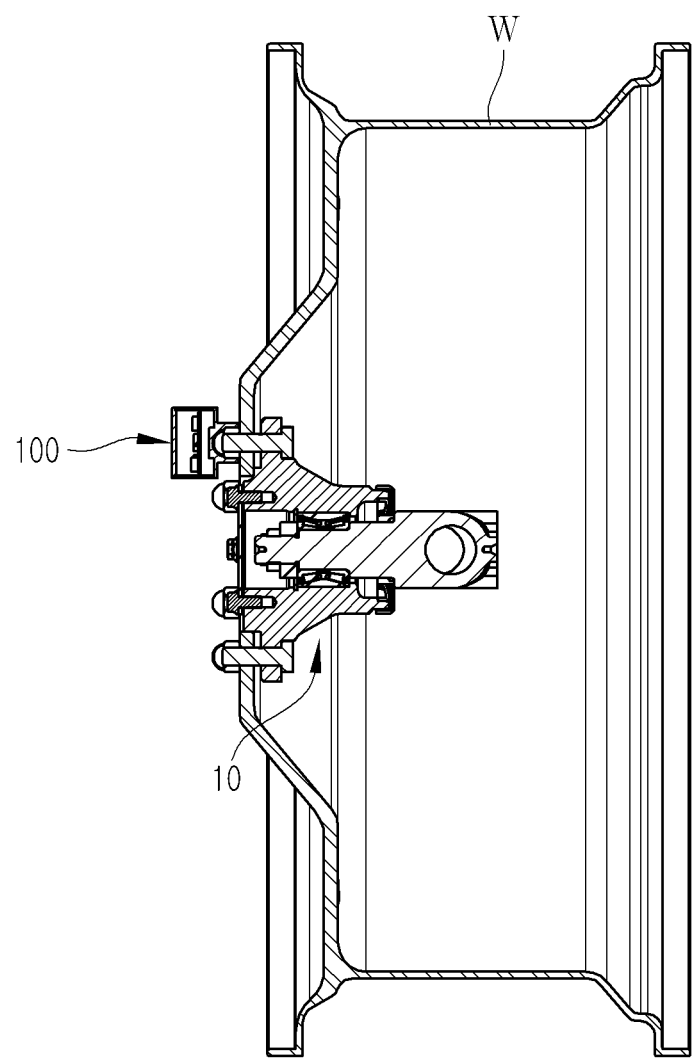
FIG. 2 exemplarily shows a state in which a failure diagnosis device according to one embodiment of the present disclosure is mounted to one side of a wheel of a vehicle.
Figure 3:
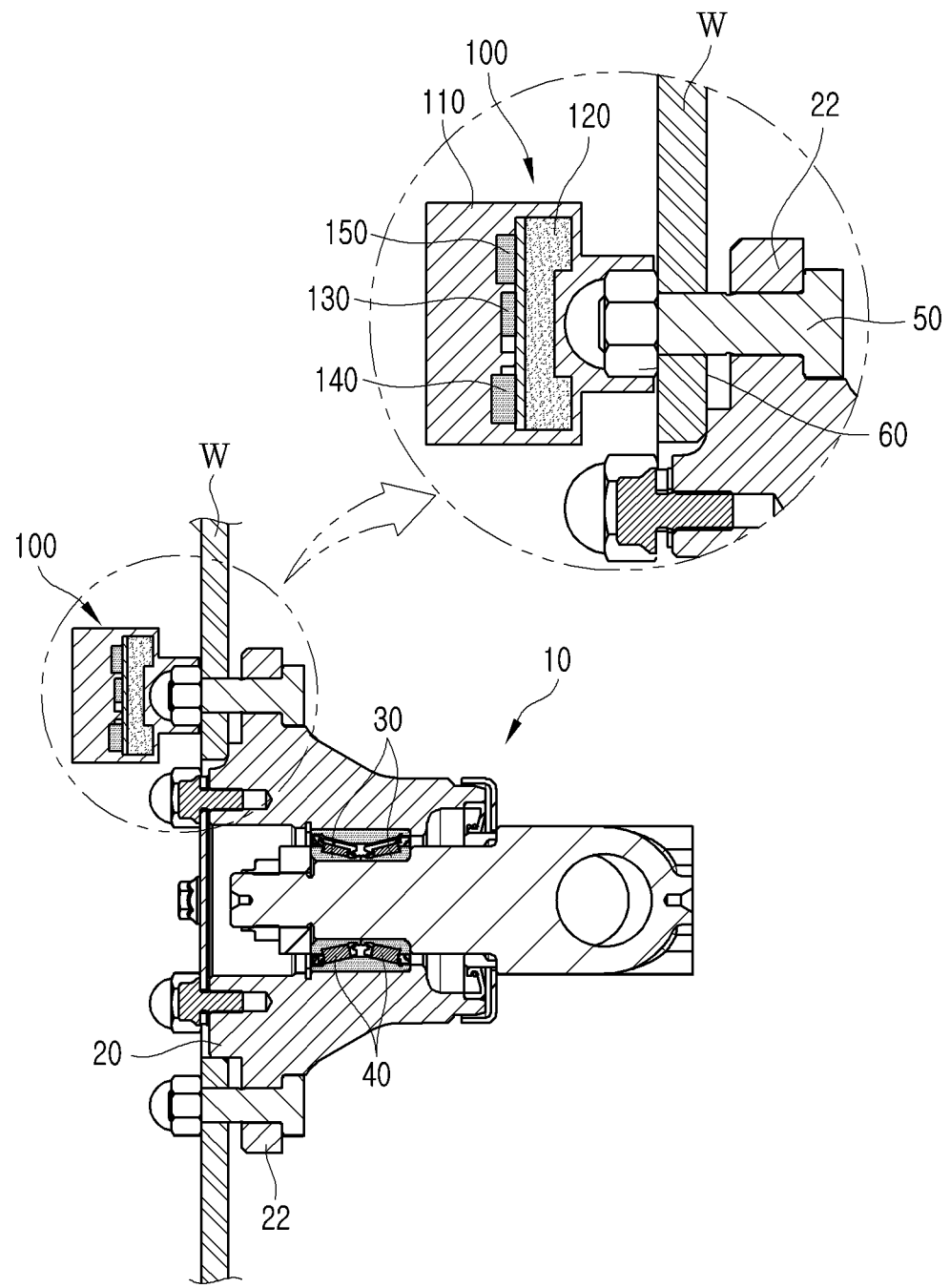
FIG. 3 exemplarily shows a state in which a failure diagnosis device according to one embodiment of the present disclosure is mounted to one side of a wheel of a vehicle.
Figure 4A:
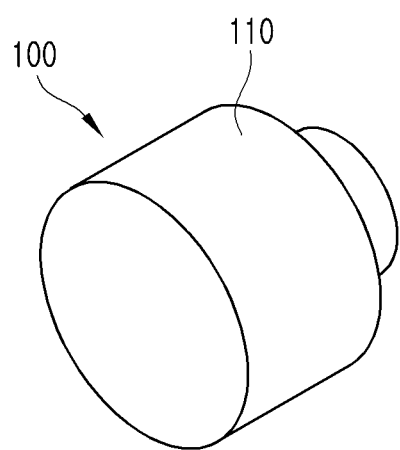
FIG. 4A exemplarily shows a structure of the failure diagnosis device according to one embodiment of the present disclosure.
Figure 4B:
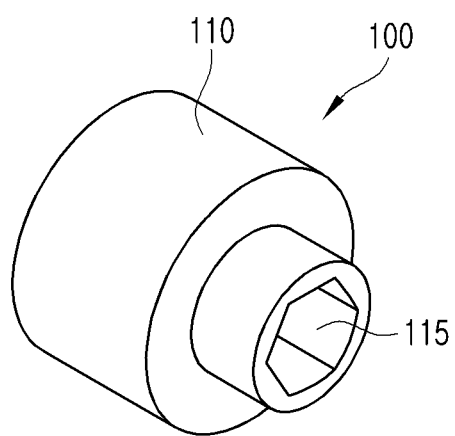
FIG. 4B exemplarily shows a structure of the failure diagnosis device according to one embodiment of the present disclosure.

As shown in FIGS. 1 to 3, the wheel bearing 10 performs a function of connecting a rotating element to which a wheel is mounted to a non-rotating element coupled to a vehicle body through rolling elements and rotatably supporting the wheel with respect to the vehicle body. For example, the wheel bearing 10 is configured to connect a rotating element 20 to which the wheel is mounted to a non-rotating element 30 fixed to the vehicle body through rolling elements 40. A wheel mounting flange 22 for mounting a wheel W thereon is provided on one side of the rotating element 20, and the wheel W is coupled to the rotating element 20 via fastening members, such as wheel mounting bolts 50 and/or wheel mounting nuts 60. For example, in the embodiment shown in the drawings, the wheel W is mounted to the rotating element 20 by inserting the wheel mounting bolt 50 into through-holes formed in the wheel mounting flange 22 of the rotating element 20 and the wheel W, and then fastening the wheel mounting nut 60 to the end of the wheel mounting bolt 50.

In the embodiment shown in the drawings, the wheel bearing is configured such that an outer member located radially outward of the rolling elements functions as a rotating element that rotates together with the wheel. However, the embodiment shown in the drawings merely illustrates an example of the basic structure of the wheel bearing for a vehicle for the purpose of describing the failure diagnosis device according to one embodiment of the present disclosure. The failure diagnosis device according to one embodiment of the present disclosure, which will be described below, may be mounted to various wheel bearings for a vehicle other than the wheel bearing having the structure shown in the drawings.

As shown in FIGS. 1 to 3, the failure diagnosis device 100 according to one embodiment of the present disclosure may be configured to be detachably mounted to one side of the wheel W coupled to the wheel bearing 10 to perform the failure diagnosis of the wheel bearing 10.

Figure 5:
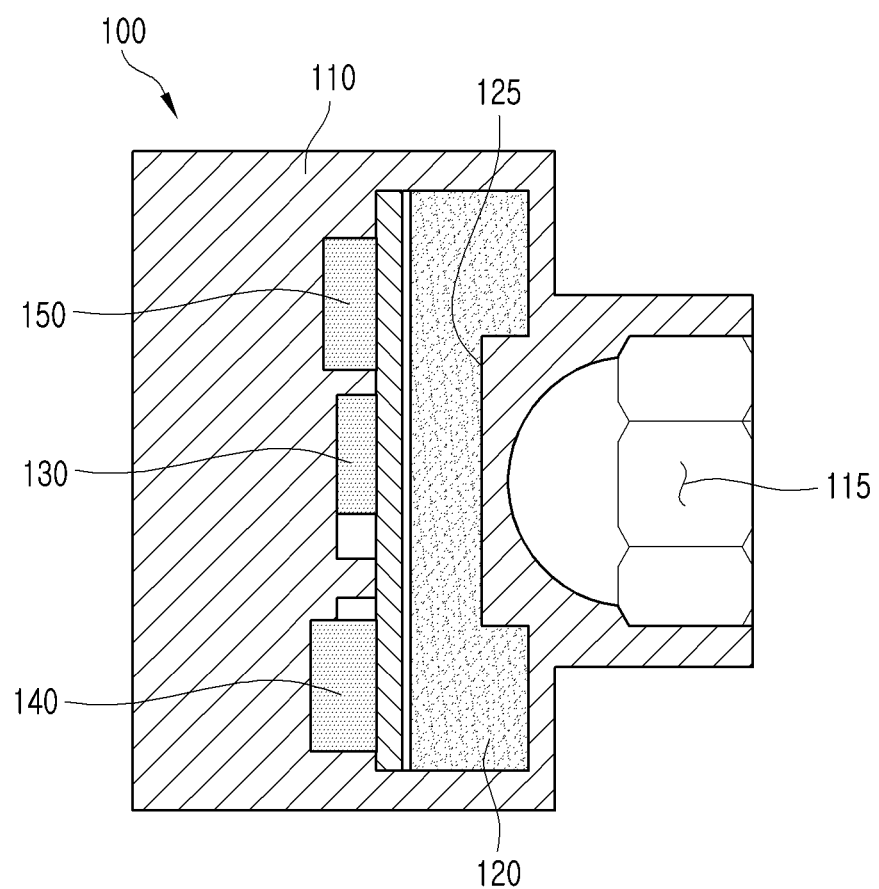
FIG. 5 exemplarily shows a cross-sectional structure of the failure diagnosis device according to one embodiment of the present disclosure.

According to one embodiment of the present disclosure, the failure diagnosis device 100 may be configured such that a magnetic coupling part 120 configured to provide a coupling force for the failure diagnosis device 100, a sensing part 130 configured to detect information on an operational state of the vehicle, and the like are provided in a housing 110 (see FIGS. 3 and 5).

According to one embodiment of the present disclosure, the housing 110 is a part that forms a body of the failure diagnosis device 100 and performs a function of enclosing and protecting the magnetic coupling part 120, the sensing part 130, and the like provided in the housing 110 from the outside. The housing 110 may be formed of a synthetic resin or the like. For example, the housing 110 may be formed by insert-molding thermoplastic plastic material or the like in a state in which components such as the magnetic coupling part 120, the sensing part 130, and the like are arranged in the housing 110 such that the components such as the magnetic coupling part 120, the sensing part 130, and the like are enclosed by the housing 110.

According to one embodiment of the present disclosure, the housing 110 is provided with a recess 115, in which a counterpart member to be coupled with the failure diagnosis device 100 is inserted and accommodated, at one side thereof. For example, as shown in FIGS. 1 to 3, the failure diagnosis device 100 of the embodiment shown in the drawings is provided with the recess 115 in which a fastening member (such as the wheel mounting bolt 50, the wheel mounting nut 60, and the like) used to mount the wheel W to the wheel bearing 10 may be inserted and accommodated.

According to one embodiment of the present disclosure, the magnetic coupling part 120 may perform a function of allowing the failure diagnosis device 100 to be mounted and fixed to the wheel W or the like by virtue of a magnetic force generated between the failure diagnosis device 100 and the counterpart member (for example, the wheel mounting bolt 50 and/or the wheel mounting nut 60) to be coupled thereto.

According to one embodiment of the present disclosure, the magnetic coupling part 120 may be formed of magnetic material such that the magnetic force is generated between the magnetic coupling part 120 and the wheel mounting bolt 50 and/or the wheel mounting nut 60 made of metallic material. The magnetic coupling part 120 may be formed to provide the magnetic force which is capable of generating a stable fastening force between the magnetic coupling part 120 and the wheel mounting bolt 50 and/or the wheel mounting nut 60. For example, the magnetic coupling part 120 may be formed by magnetizing steel material.

As described above, since the failure diagnosis device 100 according to one embodiment of the present disclosure is configured to be detachably mounted to one side of the wheel W by virtue of the magnetic force generated between the magnetic coupling part 120 and the counterpart member (for example, the wheel mounting bolt 50 and/or the wheel mounting nut 60 used to mount the wheel W to the wheel bearing 10), it is possible to easily mount the failure diagnosis device 100 to one side of the wheel W in an easier manner and to diagnose the presence of failure or abnormal operation of the wheel bearing 10, if necessary. With this configuration, even if a failure diagnosis device of a complicated structure is not provided in the wheel bearing 10 in advance at the time of manufacturing the wheel bearing 10, the user can easily diagnose the presence of failure or abnormal operation of the wheel bearing 10 using the failure diagnosis device 100 according to one embodiment of the present disclosure.

Further, as described above, the failure diagnosis device 100 according to one embodiment of the present disclosure is configured such that the counterpart member (for example, the wheel mounting bolt 50 and/or the wheel mounting nut 60) to be coupled with the failure diagnosis device 100 can be inserted into and accommodated in the recess 115 formed at one side of the housing 110. Thus, the failure diagnosis device 100 can perform the failure diagnosis of the wheel bearing 10 while rotating together with the wheel W and the wheel bearing 10 in the state in which the failure diagnosis device 100 is more stably mounted to the wheel W.

In order to ensure the more stable mounting, the failure diagnosis device 100 according to one embodiment of the present disclosure may be configured such that the magnetic coupling part 120 has an outer peripheral surface larger than that of the counterpart member (for example, the wheel mounting nut 60) to be coupled with the failure diagnosis device 100. Further, the magnetic coupling part 120 may be configured to have a groove 125 formed to be concave at one side thereof. Accordingly, the failure diagnosis device 100 according to one embodiment of the present disclosure can provide a magnetic force to the counterpart member such as the wheel mounting nut 60 in various directions.

According to one embodiment of the present disclosure, the sensing part 130 performs a function of detecting information about the operational state of the vehicle (the operational state of the wheel bearing) to diagnose the presence of failure or abnormal operation of the wheel bearing 10. According to one embodiment of the present disclosure, the sensing part 130 may be mounted on a PCB board provided in the housing 110, and may comprise an acceleration sensor configured to detect information on acceleration (vibration) that generates when the wheel bearing is operated. For example, the acceleration sensor may be provided in the failure diagnosis device 100 and may be configured to detect the vibration state of the wheel bearing 10 while rotating together with the wheel W. The acceleration sensor may be configured as any one of a one-axis acceleration sensor capable of measuring acceleration in one direction among x, y, and z-axis directions perpendicular to each other, a two-axis acceleration sensor capable of measuring acceleration in two directions among the x, y, and z-axis directions, and a three-axis acceleration sensor capable of measuring acceleration in all the x, y, and z-axis directions. The acceleration information measured by the acceleration sensor may be used to diagnose the operational state of the wheel bearing or extract speed information required for such a diagnosis.

According to one embodiment of the present disclosure, the failure diagnosis device 100 may further comprise a storage part 140 that stores the acceleration information detected by the sensing part 130, a diagnosis part 150 that diagnoses the presence of failure or abnormal operation of the wheel bearing, and the like. As a result of diagnosing the operational state of the wheel bearing by the diagnosis part 150, when it is diagnosed that the failure or abnormal operation of the wheel bearing occurs, the diagnosis result may be stored in the storage part 140 or the like provided in the failure diagnosis device 100, or may be transmitted to an ECU (Electronic Control Unit) or the like of the vehicle. Alternatively, the occurrence of abnormality may be notified to a user through a display part (not shown) provided in the failure diagnosis device 100 or the like.

According to one embodiment of the present disclosure, the failure diagnosis device 100 may be configured to calculate the speed information based on the acceleration information detected by the acceleration sensor of the sensing part 130, and subsequently, diagnose the presence of failure or abnormal operation of the wheel bearing using the acceleration information detected by the sensing part 130 and the calculated speed information.

As described above, when the failure diagnosis of the wheel bearing is performed based on the speed information calculated from the acceleration information detected by the acceleration sensor without an additional speed information provided from the outside, it is possible to eliminate a need to transmit both signals from the acceleration sensor and the speed sensor to the diagnosis device for diagnosing the wheel bearing, thereby simplifying the configuration of the diagnosis device and wheel bearing.

Alternatively, the speed information used for diagnosing the presence of failure or abnormal operation of the wheel bearing in the failure diagnosis device according to one embodiment of the present disclosure may be configured to use the speed information provided from the speed sensor or the ECU.

The method of determining the presence of failure or abnormal operation of the wheel bearing based on the detected acceleration information and/or the speed information may be performed through a conventionally-used frequency analysis. The diagnosis process of determining the presence of failure or abnormal operation of the wheel bearing is not key feature of the present disclosure, and thus the detailed description thereon will be omitted herein.

While the present disclosure has been described above by way of particular features such as specific components and the like, and exemplary embodiments, these embodiments are provided to further facilitate overall understanding of the present disclosure, and the present disclosure is not limited thereto. Various modifications and variations may be made from the above descriptions by those skilled in the art.

Therefore, the spirit of the present disclosure should not be limited to the above-described embodiments, and not only the append claims but also all those modified equally or equivalently to the claims are intended to fall within the scope of the spirit of the present disclosure.

DESCRIPTION OF REFERENCE NUMERALS

10: wheel bearing for vehicle
20: rotating element
30: non-rotating element
40: rolling element
50: wheel mounting bolt
60: wheel mounting nut
100: failure diagnosis device
110: housing
115: recess
120: magnetic coupling part
125: groove
130: sensing part (acceleration sensor)
140: storage part
150: diagnosis part

What is claimed is:

1. A failure diagnosis device used for diagnosing presence of failure or abnormal operation of a wheel bearing, comprising:
   a housing;
   a magnetic coupling part provided in the housing; and
   a sensing part provided in the housing and configured to detect physical characteristic related to an operational state of a vehicle,
   wherein the sensing part comprises an acceleration sensor configured to collect acceleration information,
   wherein the failure diagnosis device is configured to be detachably mounted to one side of a wheel by virtue of a magnetic force generated by the magnetic coupling part, and
   wherein the failure diagnosis device is configured to be detachably mounted to one side of the wheel by virtue of the magnetic force generated between a wheel mounting bolt or a wheel mounting nut, which is used to mount the wheel to the wheel bearing, and the magnetic coupling part.

2. The failure diagnosis device of claim 1, wherein the magnetic coupling part is formed by magnetizing steel material.

3. The failure diagnosis device of claim 1, wherein a recess formed to be concave is provided in one side of the housing, and the wheel mounting bolt or the wheel mounting nut, which is used to mount the wheel to the wheel bearing, is inserted into and accommodated in the recess.

4. The failure diagnosis device of claim 3, wherein the magnetic coupling part comprises a groove formed to be concave at a surface toward the recess.

5. The failure diagnosis device of claim 3, wherein the housing is formed by insert-molding thermoplastic plastic material.

6. The failure diagnosis device of claim 3, wherein the sensing part is mounted on a PCB board provided in the housing.

7. The failure diagnosis device of claim 3, further comprising a storage part that stores information on the operational state of the vehicle measured by the sensing part.

8. The failure diagnosis device of claim 3, further comprising a diagnosis part configured to diagnose the presence of failure or abnormal operation of the wheel bearing based on information on the operational state of the vehicle measured at the sensing part.

9. The failure diagnosis device of claim 8, wherein the diagnosis part is configured to perform frequency analysis on acceleration information measured by the acceleration sensor of the sensing part to diagnose the presence of failure or abnormal operation of the wheel bearing.

10. The failure diagnosis device of claim 9, wherein the diagnosis part is configured to diagnose the presence of failure or abnormal operation of the wheel bearing based on acceleration information measured by the acceleration sensor of the sensing part and speed information calculated from the acceleration information.

11. The failure diagnosis device of claim 9, further comprising a display configured to display information on the presence of failure or abnormal operation of the wheel bearing according to a diagnosis result obtained from the diagnosis part.

\* \* \* \* \*